(12) United States Patent
Girschig

(10) Patent No.: US 12,241,451 B2
(45) Date of Patent: Mar. 4, 2025

(54) HANDLING ARRANGEMENT

(71) Applicant: Siemens Gamesa Renewable Energy A/S, Brande (DK)

(72) Inventor: Florian Girschig, Skørping (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 62 days.

(21) Appl. No.: 17/840,718

(22) Filed: Jun. 15, 2022

(65) Prior Publication Data

US 2022/0412317 A1    Dec. 29, 2022

(30) Foreign Application Priority Data

Jun. 28, 2021    (EP) .................................... 21182012

(51) Int. Cl.
  *F03D 13/40*    (2016.01)
  *B66C 1/10*    (2006.01)
  *F03D 13/10*    (2016.01)

(52) U.S. Cl.
  CPC .............. *F03D 13/40* (2016.05); *B66C 1/108* (2013.01); *F03D 13/10* (2016.05); *F05B 2230/61* (2013.01)

(58) Field of Classification Search
  CPC ...... F03D 13/40; F03D 1/0675; F03D 1/0688; F03D 13/401; B60P 7/065; B65D 5/5028; B65D 81/05; B65D 81/1275; B65D 25/10; B65D 81/113; B65D 81/02; B65D 81/056; B23Q 3/086
  See application file for complete search history.

(56) References Cited

U.S. PATENT DOCUMENTS

| | | | | |
|---|---|---|---|---|
| 3,790,152 A | * | 2/1974 | Parsons .................. | B23Q 3/086 29/559 |
| 4,132,689 A | * | 1/1979 | Speyer .................... | C08L 23/20 264/237 |
| 4,361,296 A | * | 11/1982 | Hall ........................ | B64D 29/00 60/797 |
| 4,561,686 A | * | 12/1985 | Atchley ................ | B66C 1/0231 294/188 |
| 7,997,554 B2 | * | 8/2011 | Carnevali ............... | F16B 47/00 248/363 |

(Continued)

FOREIGN PATENT DOCUMENTS

| DE | 102018004152 A1 | * | 11/2019 | ............. F03D 13/10 |
|---|---|---|---|---|
| EP | 3792211 A1 | | 3/2021 | |

(Continued)

OTHER PUBLICATIONS

European Search Report issued on Nov. 11, 2021 for application No. 21182012.1.

*Primary Examiner* — Gregory W Adams
(74) *Attorney, Agent, or Firm* — Schmeiser, Olsen & Watts LLP

(57) ABSTRACT

A handling arrangement for handling a wind turbine rotor blade includes a frame assembly realized to fit about the airfoil of the rotor blade; a number of add-on covers arranged to fit between the frame assembly and the airfoil surface, wherein an add-on cover is shaped to fit around a number of add-ons; and a load-bearing material for filling the add-on cover when the add-on cover is pressed against the rotor blade. A method of handling a wind turbine rotor blade is also provided.

14 Claims, 5 Drawing Sheets

(56) References Cited

U.S. PATENT DOCUMENTS

| | | | | |
|---|---|---|---|---|
| 8,210,346 B2* | 7/2012 | Johnson | ................ | F42B 39/24 |
| | | | | 206/522 |
| 8,272,822 B2* | 9/2012 | Casazza | ................ | F03D 13/40 |
| | | | | 410/155 |
| 9,463,541 B2* | 10/2016 | Sherrill | ................ | B23Q 3/082 |
| 2005/0205644 A1* | 9/2005 | Meier | ................ | F01D 5/147 |
| | | | | 228/47.1 |
| 2009/0068018 A1 | 3/2009 | Corten | | |
| 2011/0135417 A1* | 6/2011 | Riddell | ................ | F03D 13/40 |
| | | | | 410/44 |
| 2011/0272537 A1* | 11/2011 | Gindy | ................ | B25B 11/002 |
| | | | | 248/309.4 |
| 2015/0329036 A1 | 11/2015 | Johnson et al. | | |
| 2017/0218915 A1* | 8/2017 | Wilmot | ................ | B66C 1/0287 |
| 2018/0195497 A1 | 7/2018 | Neumann | | |

FOREIGN PATENT DOCUMENTS

| | | |
|---|---|---|
| NL | 2000301 C1 | 5/2008 |
| WO | 0116482 A1 | 3/2001 |
| WO | 2014198353 A1 | 12/2014 |

* cited by examiner

HANDLING ARRANGEMENT

CROSS-REFERENCE TO RELATED APPLICATIONS

This application claims priority to EP Application No. 21182012.1, having a filing date of Jun. 28, 2021, the entire contents of which are hereby incorporated by reference.

FIELD OF TECHNOLOGY

The following relates to a handling arrangement for handling a wind turbine rotor blade.

BACKGROUND

A wind turbine rotor blade can be equipped with functional add-ons to improve its aerodynamic performance, to reduce noise, etc. Add-ons can be relatively small protruding items attached on the rotor blade surface to interact with the airflow. One example of add-ons are vortex generators, small vanes designed to delay stall.

Add-ons can significantly improve the performance of a wind turbine rotor blade, but adds to the complexity in handling and installation. For example, a handling tool such as a clamp cannot be placed directly over the add-ons in order to avoid damaging them. However, add-ons are often placed in locations that are the preferred contact regions for handling tools such as lifting fittings, for example a favorable location for a set of vortex generators might be in a line along the thickest part of the airfoil. This line of maximum thickness usually coincides with the outer end of a structural web in the interior of the rotor blade, and is therefore the preferred location for placing contact points of a handling tool such as a lifting fitting. This is problematic especially in the case of add-ons located in the vicinity of the rotor blade's center of mass.

To avoid contact between the vortex generators and any part of a handling tool, the simplest option is to keep any contact regions free of add-ons. However, leaving out even only a small number of such add-ons comes at the cost of sub-optimal aerodynamic performance. Alternatively, the rotor blade may be handled to avoid contact between any handling apparatus and the add-ons. For example, when lifting the rotor blade to the hub of a wind turbine during the installation procedure, the rotor blade can be held in a vertical orientation, with its root end pointing upwards and its tip end pointing downwards. A disadvantage of this approach is that the rotor blade must be first turned from a horizontal orientation (the usual orientation during transport) to a vertical position, and such a manoeuvre is difficult and hazardous.

In another approach, the rotor blade may be held horizontally, with its leading edge facing downwards and its trailing edge facing upwards. In such an orientation, the weight of the rotor blade can be transferred vertically through its leading edge to the handling arrangement. However, the wind loading on the upright windward surface of the rotor blade can be very high and the resulting deflections and oscillations can severely hamper the installation procedure, and can significantly increase the risk of injury to personnel and the risk of damage to lifting equipment.

For these reasons, it may be desirable to hold the rotor blade in a horizontal orientation, with its leading edge and trailing edge forming a horizontal plane, e.g. with the leading edge facing in the upwind direction. However, this requires that a handling apparatus be constructed to avoid any contact with add-ons on the outer surface(s) of the rotor blade. If the add-ons are arranged in the usual configuration, i.e. in close vicinity with the structural web, it may be necessary for the handling apparatus to clamp the rotor blade at a sub-optimal position, i.e. in front of or behind the line of maximum thickness. Alternatively, one or more groups of add-ons may be "sacrificed" to leave room for pads of the handling arrangement. However, this comes at the cost of aerodynamic performance.

SUMMARY

An aspect relates to provide a way of handling a rotor blade that avoids damage to any add-ons on its outer surface.

In the context of embodiments of the invention, it shall be understood that a wind turbine rotor blade is equipped with functional attachments, usually referred to as add-ons, that protrude from a surface of the rotor blade. For example, a row of triangular vanes may be arranged on the suction side of the rotor blade, parallel to the leading edge. The row of add-ons may commence near a shoulder or transition between airfoil and root end, and may extend along some length of the rotor blade. Of course, there are many reasons for providing add-ons and many possible locations for such devices. In the following, it is assumed that add-ons are present in a region of the rotor blade that is of relevance during a handling procedure such as lifting, turning etc.

According to embodiments of the invention, the handling arrangement comprises a frame assembly realized to fit about the airfoil of the rotor blade; a number of add-on covers arranged to fit between the frame assembly and the airfoil surface, wherein an add-on cover is shaped to fit around a number of add-ons; and a load-bearing material for filling the add-on cover when the add-on cover is pressed against the rotor blade. The load-baring material of the inventive handling arrangement shall be understood to comprise an essentially non-compressible material, i.e. the volume of the material is left essentially unchanged under pressure. The essentially non-compressible material shall be understood to comprise a particulate material and/or a non-solid material such as a liquid or gel. The load-bearing material can comprise a single substance or a combination of substances.

An advantage of the inventive handling arrangement is that it facilitates protection of the add-ons without adding to the complexity of any handling and/or lifting maneuver. An add-on cover can be shaped to fit about several of an already present series of add-ons. The load-bearing material fills the add-on cover, so that the interior of the add-on cover is essentially filled by this material. During handling, the weight of the rotor blade is transferred by the load-bearing material to the add-on cover and from thence to the frame assembly. When no longer needed, the add-on cover is simply removed, and the load-bearing material can be allowed to disperse.

According to embodiments of the invention, the method of handling a wind turbine rotor blade comprises an initial step of arranging the rotor blade with its airfoil in an essentially horizontal orientation, i.e. it shall be understood that the rotor blade is arranged so that its airfoil chord plane is essentially horizontal. The method further comprises the steps of arranging the frame assembly of the inventive handling arrangement about the airfoil of the rotor blade; arranging an add-on cover of the handling arrangement around a number of add-ons; pressing the add-on cover against the rotor blade; and filling an essentially non-compressible load-bearing material into the add-on covers of the handling arrangement. The steps can be carried out in any suitable order, for example the add-on cover can be filled with the load-bearing material before it is pressed against the rotor blade, or afterwards.

The frame assembly may be assumed to comprise some holding or clamping apparatus that fits about the airfoil and which can be operated to securely hold the rotor blade during handling. For example, the frame assembly can be realized as a hydraulic or motorized clamping mechanism that can be operated remotely. The handling arrangement may be assumed to be realized for hoisting by a crane, for example a crane of an installation vessel equipped to assemble offshore wind turbines.

In the following, it may be assumed that the rotor blade is being held in a horizontal orientation during handling, and that the suction side is facing downwards. This orientation has the advantage that the lift forces are kept to a manageable minimum as the rotor blade is being hoisted into place to the height of the hub. The drawback of this orientation is that add-ons are generally mounted at least on the suction side, usually in a region along a line coinciding with the thickest part of the airfoil portion, which is also the preferred location for positioning the pads of a handling apparatus. Add-ons may also be present on the pressure side, for example in the case of a rotor blade constructed to have an airfoil with high relative thickness. Such "thick" airfoils are prone to stall and benefit from add-ons on the pressure side, for example a row of vortex generators arranged along the first 30% or so of the rotor blade length.

As explained above, the web in the interior of the rotor blade generally extends along the widest transverse of the airfoil, and pads of a handling apparatus are placed on either side of the web for optimal load transfer. A conventional handling tool therefore cannot be used to lift such a rotor blade in its "upside-down airfoil" position when add-ons are present in the preferred pad positions. Embodiments of the invention offer a solution to this problem as explained herein.

The expressions "add-on cover", "add-on protector", "protective cover", "protective cup" or simply "cup" or "cover" are regarded as synonyms in the context of embodiments of the invention and may be used interchangeably herein.

The essentially non-compressible load-bearing material (referred to simply as "filler" in the following) comprises any of: any particulate such as sand, a gel such as a water-based gel, a colloid such as a sand/water mixture, a liquid such as freshwater or sea-water. The filler can comprise any combination of the afore-mentioned materials. In the case of a gel or colloid, the filler is water-soluble. The filler also does not adhere significantly to a surface, so that it can be removed easily from the interior of the cup or from the surfaces of the airfoil and add-ons. The chosen filler is environmentally safe, so that it disperses and/or degrades without any risk to the environment.

An add-on protector can have any suitable shape and can be made from any suitable material. In a preferred embodiment of the invention, an add-on cover is made of a rigid housing that can be attached or mounted to the frame assembly. For example, an add-on cover may be shaped as an oval, round or regular container or box with an essentially flat base, or as a bowl or dish with a rounded base. The base may be adapted for bolting, welding or otherwise attaching to a suitable part of the frame assembly. An add-on cover may replace a pad of a conventional handling apparatus, so that there is no need to construct an entirely new handling apparatus. The add-on cover serves essentially the same purpose as a pad, and may be referred to in the context of a pad in the following.

The depth of a protective cup is somewhat greater than the height of an add-on. For example, if the add-ons to be protected are 3 cm in height, the protective cup has a depth in the order of 4 cm.

To contain the filler during the lifting/handling maneuver, a protective cup comprises a seal extending about the upper edge of the housing. Such a seal can be realized as an inflatable chamber or hose, for example. Alternatively, a seal can be realized as a flexible lip made of rubber or some other material. Equally, a seal may be realized as a gasket. The seal is realized to contain the filler within the cover during handling. In a particularly preferred embodiment of the invention, the seal is shaped to curve inwards, so that when the protective cover is pressed against the rotor blade surface, the ensuing pressure on the filler material acts to press the seal against the rotor blade, with the result that the filler material is reliably contained within the cover at all times.

A protective cup can be shaped to conform to the curved shape of the airfoil. Alternatively or in addition, adaptation to the profile of the airfoil can be achieved by a seal with suitable dimensions, so that filler is effectively prevented from passing between the seal and the airfoil surface.

As indicated above, the load-bearing material can be filled into a protective cover before this is pressed against the surface of the rotor blade. Alternatively, it may be desirable to first arrange the cover relative to a group of add-ons, and then press the cover against the airfoil surface before finally filling it with the chosen load-bearing material. To this end, an add-on cover comprises a port for conveying the chosen filler into the cavity when the cover is in place against the rotor blade. In this way, the interior cavity can be optimally filled with the load-bearing material. The inlet port is particularly advantageous when the chosen filler is a liquid, a particulate, or a combination (e.g. sand and water).

After the rotor blade has been mounted to the hub, the handling apparatus is detached, for example by remote control of the frame assembly to release the airfoil. The filler can now escape from the add-on cover. There is no need to collect the filler: in the case of water, this will simply run off the rotor blade; in the case of wet or dry sand, this will simply drop off the rotor blade; a gel or colloid may slide off the rotor blade or may be dissolved by rain.

When releasing the frame assembly after connecting the horizontally-oriented rotor blade to the hub, there may be some lateral displacement between frame assembly and rotor blade. This might arise on account of an imperfect alignment of the crane with the centre of mass of the handling apparatus, on account of wind loading, etc. A significant advantage of embodiments of the invention is that when the frame assembly is released from the rotor blade, any such lateral displacement of the frame assembly with its add-on cover will not result in undesirable sideways forces on the add-ons, since the particulate, liquid or colloid filler (which is still in the cup) is physically unable to carry or transfer significant shear loads, particularly when the cover is no longer pressed against the rotor blade.

The inventive handling arrangement can be used at any handling stage of a finished rotor blade. The step of arranging the frame assembly about the airfoil is carried out after a final manufacturing stage of the rotor blade, for example after a final polishing step at which point the rotor blade is ready for transport to its final destination. Any add-on covers of the handling arrangement are released after installation of the rotor blade, i.e. after the root end of the rotor blade has been attached to the hub of a wind turbine. This approach is particularly suited to handling apparatus that is already intended to remain in place during all transport and handling stages. In this way, the vulnerable add-ons on a rotor blade surface are protected during all handling stages.

The frame assembly can be equipped with a number of additional pads that are arranged to lie against the surface of the rotor blade, with the purpose of contributing to the stability of the load during lifting. For example, a stabilizing pad can be arranged on either side of an add-on cover placed over add-ons on the underside of the rotor blade. In this embodiment, a stabilizing pad can be arranged further towards the leading edge and/or a stabilizing pad can be arranged further towards the trailing edge. During lifting, the weight of the rotor blade is transferred primarily through the housing of the add-on cover to the handling frame, and the stabilizing pads can assist in carrying—i.e. transferring—the loads in the horizontal direction. Similarly, if the pressure side is facing upwards during lifting, and no add-ons are present along the region of maximum thickness, a stabilizing pad can be arranged at that location.

BRIEF DESCRIPTION

Some of the embodiments will be described in detail, with reference to the following figures, wherein like designations denote like members, wherein.

DETAILED DESCRIPTION

Figure 1:
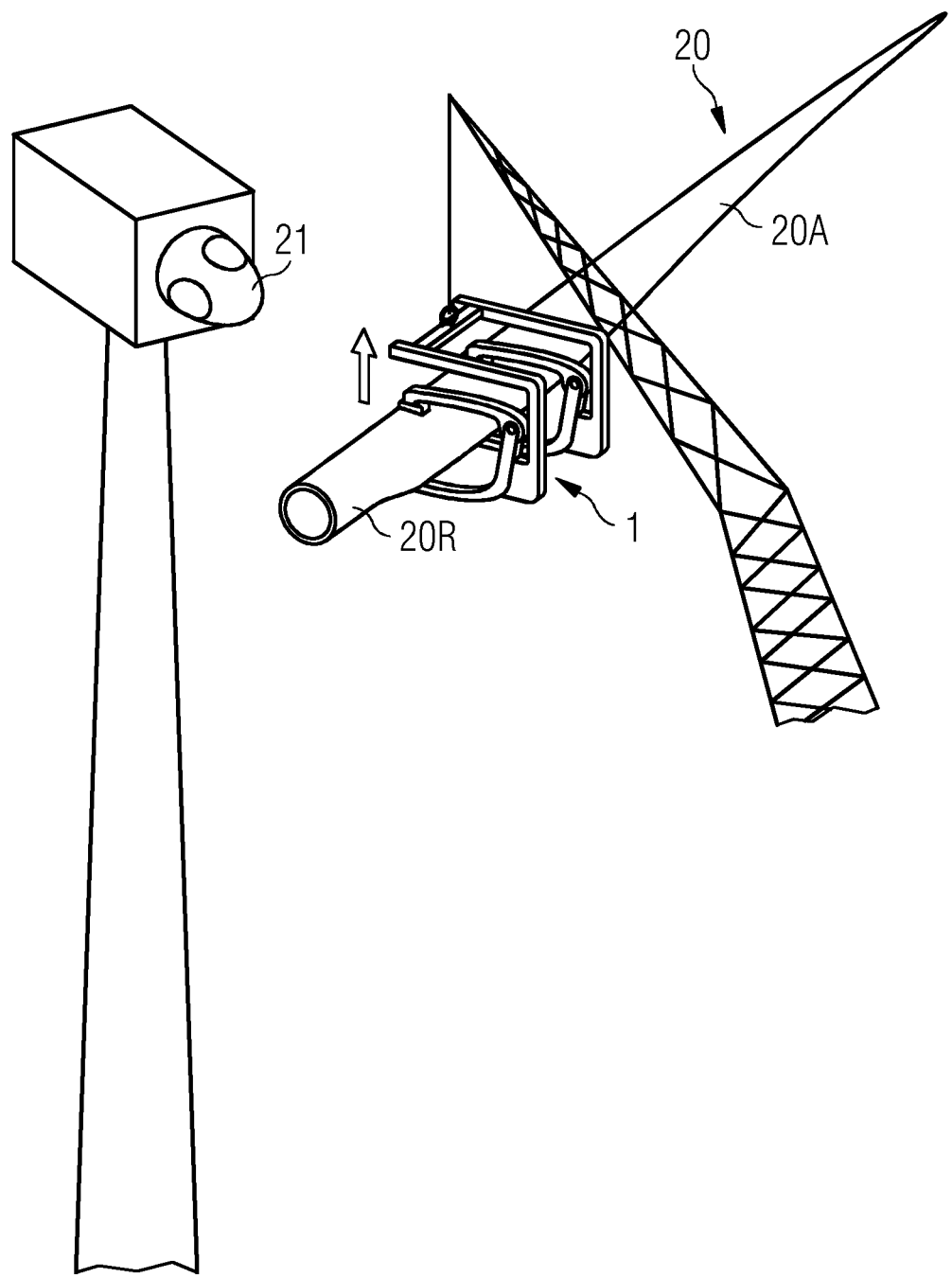
FIG. 1 illustrates a stage in a method of handling a wind turbine rotor blade.

FIG. 1 shows a wind turbine rotor blade 20 during an installation procedure. The rotor blade 20 is being hoisted to the level of the hub 21 of an offshore wind turbine, so that its root end 20R can be attached to the hub 21. A handling arrangement 1 holds the rotor blade 20 as shown, i.e. with its airfoil 20A in an essentially horizontal orientation, and this handling arrangement 1 is hoisted by a crane (only partially shown), for example a crane on an installation vessel in the case of an offshore wind turbine.

Figure 2:
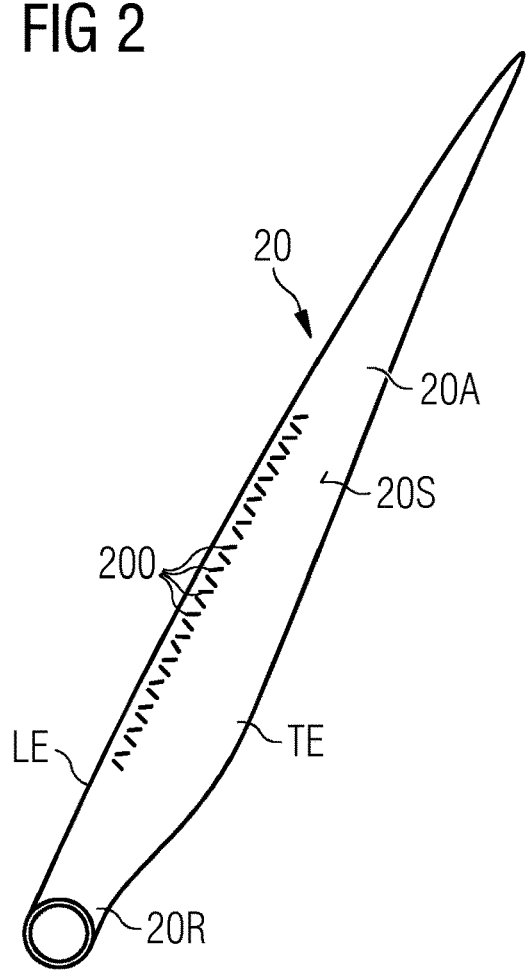
FIG. 2 shows a rotor blade of the wind turbine having an arrangement of add-ons on a suction side, in accordance with an embodiment of the present invention.

Each rotor blade 20 of the wind turbine 2 has an arrangement of add-ons 200 on its suction side 20S, as shown in the exemplary embodiment illustrated by FIG. 2. The add-ons 200—in this case vortex generators—are arranged essentially parallel to the leading edge LE and serve to improve the aerodynamic performance of the rotor blades 20. Of course, the rotor blade may be equipped with other further arrangements of add-ons, and may also have add-ons on its pressure side.

Figure 3:
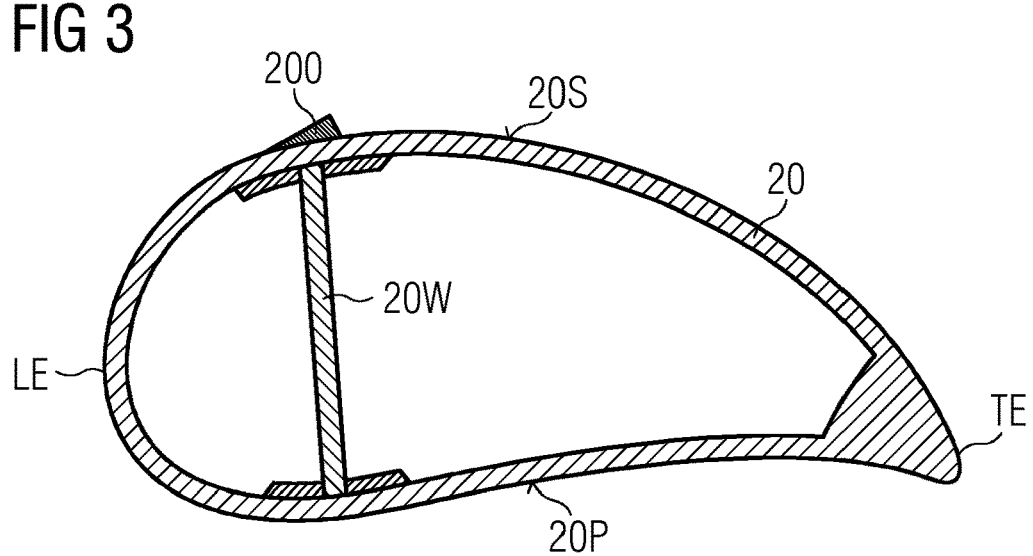
FIG. 3 shows an exemplary wind turbine rotor blade.

During the lifting procedure, the rotor blade can be held with its suction side 20S facing downwards. This is to avoid unfavorably large lift forces that would be caused by airflow over the rotor blade 20, as will be known to the skilled person, especially if the leading edge LE faces into the wind. However, as shown in FIG. 3, a favored location for add-ons 200 is in line with a structurally reinforcing web 20W arranged in the rotor blade interior. This position is therefore also the most suitable location for placing a pad of a handling arrangement. Conventionally, the solution has been to omit a sufficient number of add-ons to leave a gap for a lifting apparatus pad (with an associated reduction in aerodynamic efficiency), or to construct a pad for placement to one or both sides of the add-ons (thereby risking damage to the rotor blade).

Figure 4:
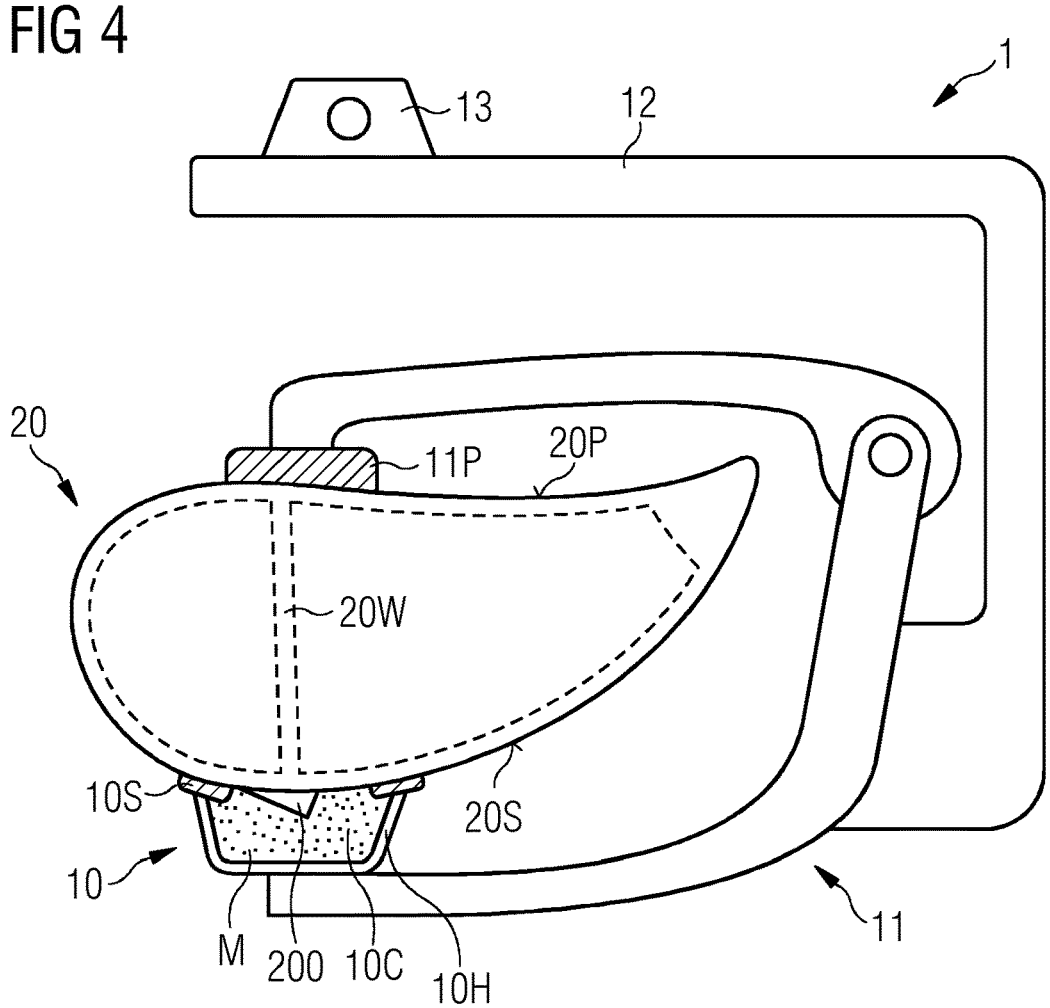
FIG. 4 shows an embodiment of the handling apparatus during a handling, transport or lifting stage.

The inventive handling arrangement 1 is constructed to be able to grasp the rotor blade 20 without damaging any of the add-ons 200. This is illustrated in FIG. 4, which shows the handling arrangement 1 in place about a rotor blade 20, which is oriented so that its suction side 20S faces downward. In this exemplary embodiment, the handling arrangement 1 comprises a frame assembly 11 realized to fit about the airfoil 20A of the rotor blade 20, and to clamp the rotor blade 20 between pads 10, 11P in a region near the center of mass of the rotor blade 20. Here, the pads 10, 11P are essentially in line with the structurally reinforcing web 20W in the rotor blade interior. The diagram shows a protective cup 10 arranged to fit between the frame assembly 11 and the airfoil surface of the downward-facing suction side 20S, and a further pad 11P arranged to fit between the frame assembly 11 and the airfoil surface of the upward-facing pressure side 20P. The protective cup 10 has a rigid housing 10H that is shaped to define a volume or cavity 10C which encloses or surrounds one or more add-ons 200 protruding from the airfoil surface. The cavity 10C defined by the housing 10H and the airfoil surface is filled with a non-compressible load-bearing material M. A seal 10S arranged about the perimeter of the housing 10H ensures that the load-bearing material M cannot escape during the lifting procedure. The frame assembly 11 of the handling arrangement 1 is connected by means of an outer structure 12 and lifting eyelet 13 to a hoisting apparatus such as a crane. The frame assembly 11 can be opened and closed by means of remote control, as will be known to the skilled person.

Figure 5:
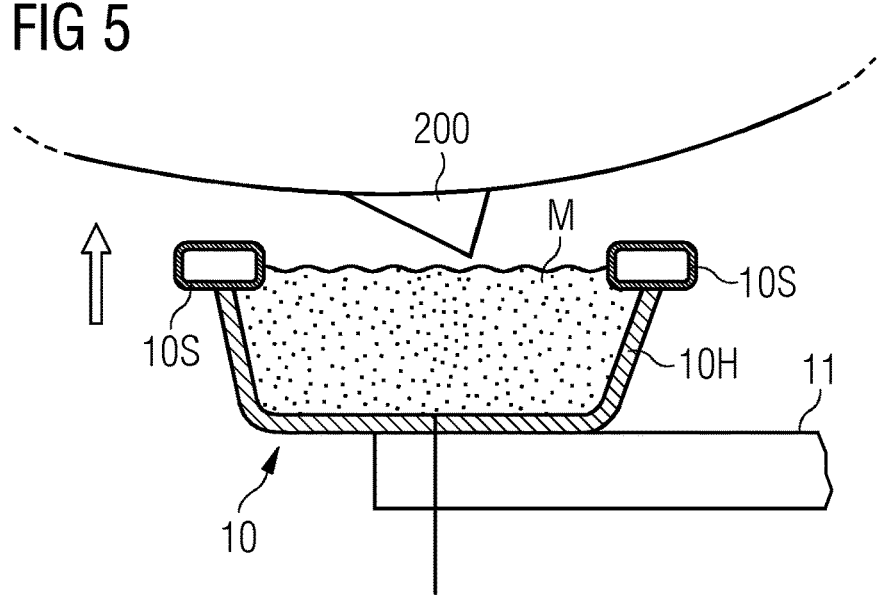
FIG. 5 shows a protective cup according to an embodiment of the present invention.

FIG. 5 shows a protective cup 10 in one possible embodiment of the invention. Here, the protective cup 10 is filled with the chosen load-bearing material M before being pressed against the airfoil surface 20S. The diagram shows the rotor blade 20 arranged so that a surface with add-ons 200 is arranged to face downwards. In this exemplary embodiment, the seal 10S is realized as an inflatable chamber or tube which, when inflated, will conform to the surface of the rotor blade.

Figure 6:
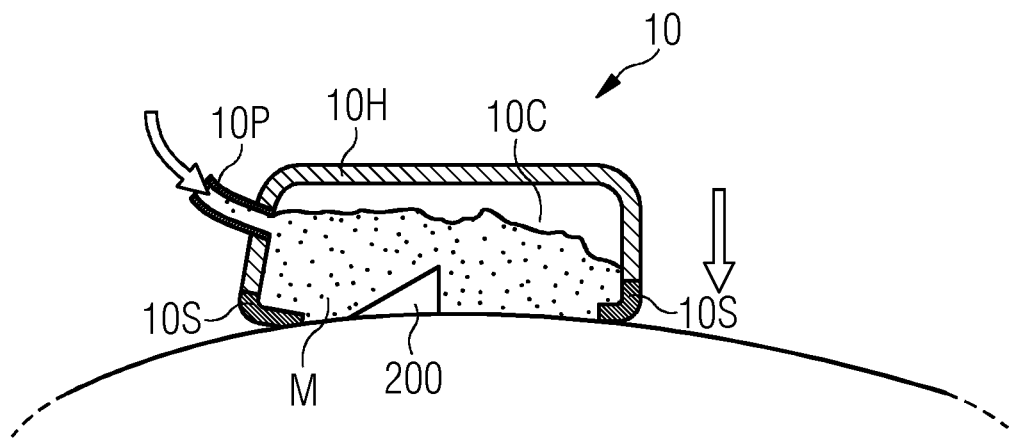
FIG. 6 shows a protective cup according to another embodiment of the present invention.

FIG. 6 shows a further possible embodiment of the invention. The rotor blade 20 is arranged so that a surface carrying add-ons 200 faces upwards. A protective cup 10 mounted on the frame of the handling arrangement 1 is arranged in place about a group of add-ons 200. The frame assembly is clamped about the rotor blade 20 so that pressure is applied to press the seal 10S against the rotor blade surface. In this exemplary embodiment, the protective cup 10 is equipped with a port 10P through which the load-bearing material M can be introduced to fill the cavity 10C. In this exemplary embodiment, the seal 10S is realised as a flexible lip which, when pressed against the rotor blade, will conform to the surface of the rotor blade. In this case, the seal 10S faces inwards, so that the filler M will press against the seal 10S, causing it to make optimal contact with the rotor blade surface during the entire handling procedure, thereby increasing the effectiveness of the seal 10S. The load-bearing material M can be sand, water, a gel, a colloid, etc. For example, sand can be filled into the protective cup 10. With sand (or any comparable granulate material) as a filler, the protruding add-ons can bury into the granulate. When the cover is pressed against the airfoil surface, the granulate contacts the rotor blade surface. The grains of sand are pressed together, making contact by virtue of their many surfaces, and can therefore very effectively transfer the downward load to the frame assembly when the rotor blade is being lifted, while the add-ons are not subject to any loading and are optimally protected from damage. The filler can simply be dry sand, or a quantity of water can be added to form a colloid filler and to further improve the effectiveness of load transfer within the cup.

A combination of insoluble granulate and water can advantageously reduce the lateral forces on the seal, and can be the preferred choice of filler in the case of relatively robust add-ons. More vulnerable add-ons may benefit from a dry granulate or other filler such as a gel or colloid.

Alternatively, as explained above, the load-bearing material M can be any particulate or granular material that is essentially non-compressible and which will not adhere to the rotor blade, i.e. a material that will detach from the rotor blade 20 without any assistance. For example, a water-based gel may simply slide off the rotor blade 20 or may be washed off by rain. The materials mentioned above are non-polluting and do not present any environmental risk.

Of course, the features of the embodiments described above—i.e. the choice of seal, the choice of filler, etc. can be combined or exchanged in any reasonable manner.

Figure 7:
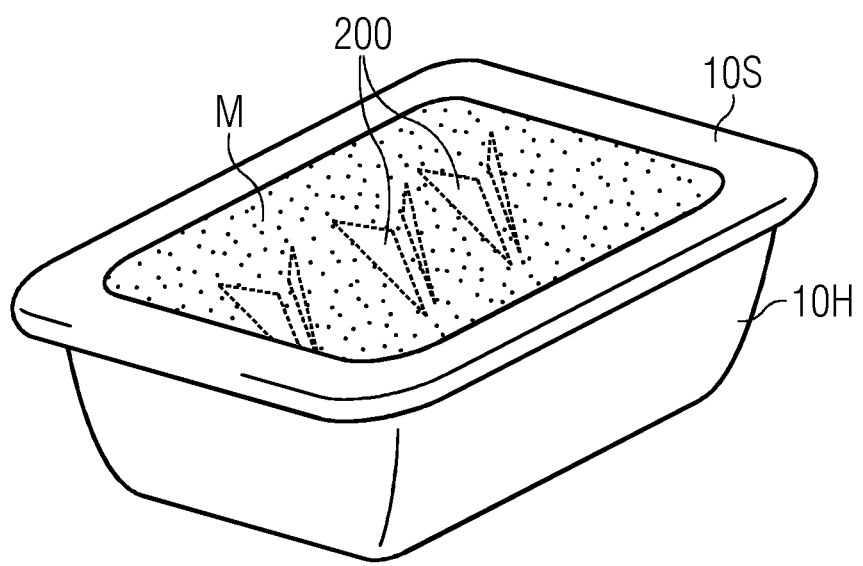
FIG. 7 shows a perspective view of a protective cup according to an embodiment of the present invention.

FIG. 7 shows a perspective view of a protective cup 10 as described above. The diagram shows the housing 10H and the seal 10S about the perimeter of the housing 10H. A group of vortex generators 200 is indicated by dotted lines, and the diagram shows how these will be safely enclosed by the filler M when the cup 10 is put into place about the vortex generators 200. The load-bearing material M will be prevented from escaping from the cup 10 when the seal 10S is pressed against the rotor blade surface.

Figure 8:
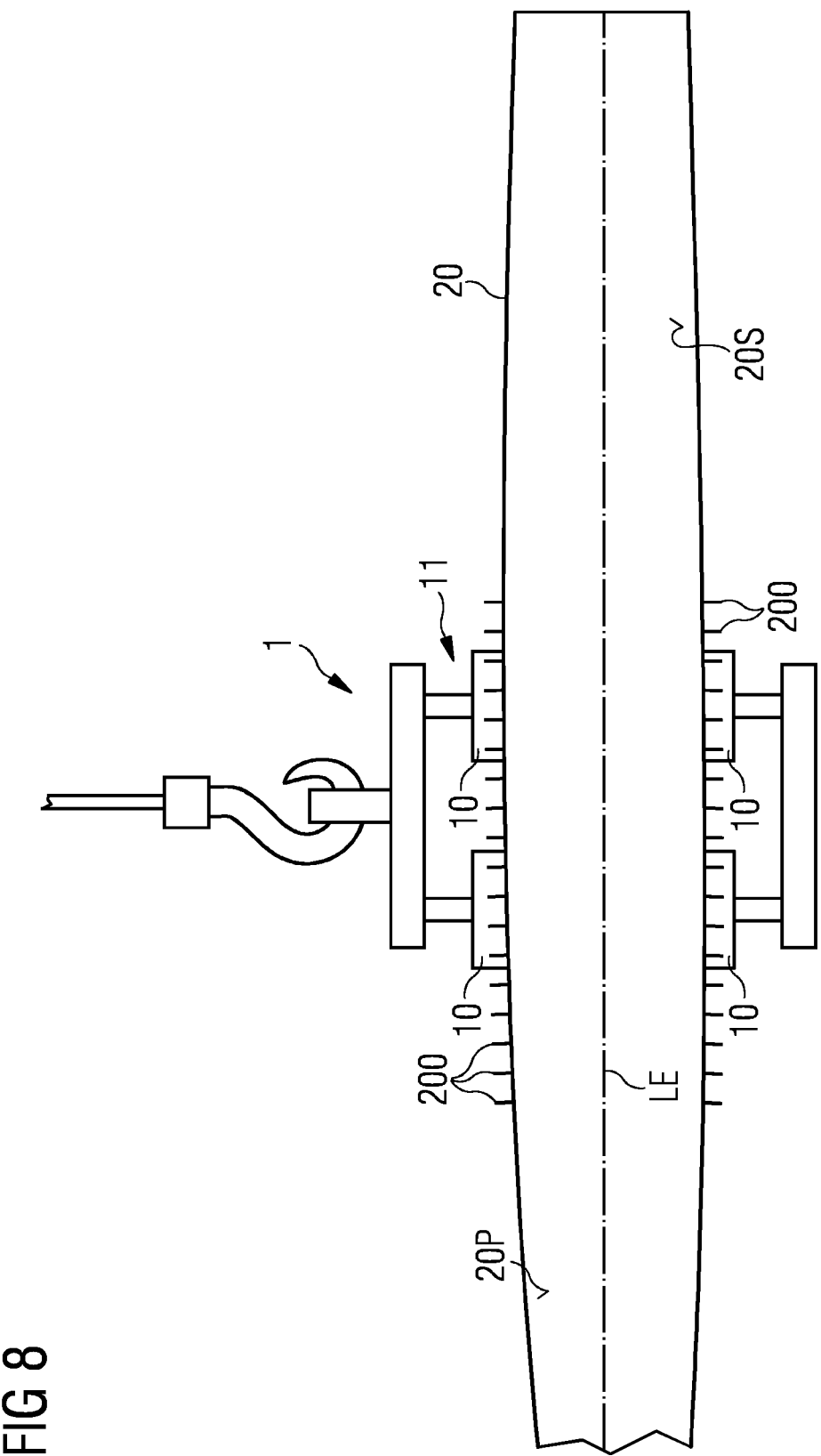
FIG. 8 shows details of exemplary embodiments of the inventive handling arrangement.

FIG. 8 shows a further possible embodiment of the invention. Here, the rotor blade 20 has add-ons 200 on its suction side 20S and also on its pressure side 20P. The handling arrangement 1 is equipped with appropriately arranged protective cups 10 for placement over the add-ons on the suction side 20S and also on the pressure side 20P, so that the add-ons 200 remain undamaged during handling of the rotor blade. In this embodiment, two protective covers 10 are provided for each of the suction side 20S and the pressure side 20P.

Although the present invention has been disclosed in the form of preferred embodiments and variations thereon, it will be understood that numerous additional modifications and variations could be made thereto without departing from the scope of the invention. For example, the filler material can be collected after completion of a handling maneuver, for example by extracting the material through a port and conveying it to a storage container.

For the sake of clarity, it is to be understood that the use of "a" or "an" throughout this application does not exclude a plurality, and "comprising" does not exclude other steps or elements.

The invention claimed is:

1. A handling arrangement for handling a wind turbine rotor blade, comprising:
a frame assembly configured to fit about an airfoil of the rotor blade; and
a plurality of add-on covers arranged to fit between the frame assembly and an airfoil surface, wherein an add-on cover has a rigid housing and is shaped to define a cavity that surrounds one or more add-ons;
wherein the cavity is filled with an essentially non-compressible load-bearing material;
wherein the add-on cover comprises a seal arranged about a perimeter of the rigid housing.

2. The handling arrangement according to claim 1, wherein the add-on cover is adapted for mounting to the frame assembly.

3. The handling arrangement according to claim 1, wherein the seal is an inflatable chamber, a flexible lip, or a gasket.

4. The handling arrangement according to claim 1, wherein the seal is shaped to face inwards.

5. The handling arrangement according to claim 1, wherein the load-bearing material comprises a particulate, a gel, a colloid, or a liquid.

6. The handling arrangement according to claim 1, wherein the load-bearing material is water-soluble and/or non-adhesive.

7. The handling arrangement according to claim 1, wherein the add-on cover comprises a port for conveying the load-bearing material into the cavity when the add-on cover is pressed against the rotor blade.

8. The handling arrangement according to claim 1, wherein the add-on cover is arranged for placement along a region of maximum thickness of the airfoil.

9. A method of handling a wind turbine rotor blade equipped with surface add-ons, of the method comprising:
arranging the rotor blade with an airfoil in an essentially horizontal orientation;
arranging a frame assembly of a handling arrangement about the airfoil of the rotor blade;
arranging an add-on cover of the handling arrangement around a plurality of add-ons, wherein the add-on cover has a rigid housing and is shaped to define a cavity that surrounds the plurality of add-ons, wherein the add-on cover comprises a seal arranged about a perimeter of the rigid housing;
pressing the add-on cover against the rotor blade; and
filling the cavity of the add-on cover of the handling arrangement with a non-compressible load-bearing material.

10. The method according to claim 9, further comprising connecting the handling arrangement to a hoisting apparatus and lifting the rotor blade to a height of a hub.

11. The method according to claim 9, further comprising initially arranging the rotor blade with a suction side facing downwards.

12. The method according to claim 9, wherein the pressing the add-on cover against the rotor blade precedes the filling the load-bearing material into the add-on cover.

13. The method according to claim 9, further comprising introducing a granulate material and a liquid into the add-on cover such that the load-bearing material comprises a granulate and a liquid.

14. The method according to claim 9, wherein the arranging the frame assembly about the airfoil is carried out after a final manufacturing stage of the rotor blade, and the add-on cover is released after installation of the rotor blade to a hub of a wind turbine.

* * * * *